(12) United States Patent
Fattal

(10) Patent No.: US 10,345,505 B2
(45) Date of Patent: Jul. 9, 2019

(54) MULTIBEAM DIFFRACTION GRATING-BASED COLOR BACKLIGHTING

(71) Applicant: LEIA INC., Menlo Park, CA (US)

(72) Inventor: David A. Fattal, Mountain View, CA (US)

(73) Assignee: LEIA, INC., Menlo Park, CA (US)

( * ) Notice: Subject to any disclaimer, the term of this patent is extended or adjusted under 35 U.S.C. 154(b) by 136 days.

(21) Appl. No.: 15/374,895

(22) Filed: Dec. 9, 2016

(65) Prior Publication Data

US 2017/0090096 A1    Mar. 30, 2017

Related U.S. Application Data

(63) Continuation of application No. 14/814,244, filed on Jul. 30, 2015, now Pat. No. 9,557,466, and a continuation of application No. PCT/US2014/048923, filed on Jul. 30, 2014.

(51) Int. Cl.
*G02F 1/1335* (2006.01)
*F21V 8/00* (2006.01)
(Continued)

(52) U.S. Cl.
CPC ......... *G02B 6/0036* (2013.01); *G02B 5/1866* (2013.01); *G02B 6/002* (2013.01);
(Continued)

(58) Field of Classification Search
CPC ............. G02F 1/1335; G02F 1/133524; G02F 1/133615; G02F 1/133603; G02F 1/1336;
(Continued)

(56) References Cited

U.S. PATENT DOCUMENTS 5,184,848 A    2/1993  Itoh et al.
5,301,062 A    4/1994  Takahashi et al.
(Continued)

FOREIGN PATENT DOCUMENTS

CN    1213097 A    4/1999
CN    1619373 A    5/2005
(Continued)

OTHER PUBLICATIONS

International Search Report and Written Opinion (ISR/WO) of the International Searching Authority (ISA/KR) dated Apr. 22, 2014 (12 pages) for counterpart PCT patent application No. PCT/US2014/048923.

(Continued)

*Primary Examiner* — Thoi V Duong
(74) *Attorney, Agent, or Firm* — J. Michael Johnson

(57) ABSTRACT

Multibeam diffraction grating-based color backlighting includes a plate light guide, a multibeam diffraction grating at a surface of the plate light guide, and light sources laterally displaced from one another in a direction corresponding to a propagation axis of the plate light guide. The light sources produce light of different colors. The plate light guide is to guide light from the light sources. The multibeam diffraction grating is to couple out a portion of the guided light using diffractive coupling as a plurality of light beams of different colors in a plurality of different principal angular directions.

20 Claims, 6 Drawing Sheets

(51) Int. Cl.
*G02B 27/42* (2006.01)
*G02B 5/18* (2006.01)
*H04N 13/324* (2018.01)

(52) U.S. Cl.
CPC ......... *G02B 6/0018* (2013.01); *G02B 6/0031* (2013.01); *G02B 6/0035* (2013.01); *G02B 6/0068* (2013.01); *G02B 27/425* (2013.01); *G02B 27/4294* (2013.01); *H04N 13/324* (2018.05)

(58) Field of Classification Search
CPC ......... G02F 1/133605; G02F 1/133606; G02F 1/133609; G02F 1/133602; G02F 1/133621; G02F 1/133504; G02F 1/133553; G02F 1/13361; G02B 6/0068; G02B 6/0073; G02B 6/0055; G02B 6/0053; G02B 6/0031; G02B 6/0051; G02B 6/005; G02B 6/0088; G02B 6/009; G02B 6/0016; G02B 6/0043; G02B 6/0011; G02B 6/0091; G02B 6/002; G02B 6/0023; G02B 6/0026; G02B 6/0061; G02B 6/0036; G02B 6/0076; G02B 6/003; G02B 6/0058; G02B 6/00; G02B 6/0018; G02B 6/0025; G02B 6/0033; G02B 6/0035; G02B 6/0045; G02B 5/045; G02B 5/1866; G02B 5/0231; G02B 5/0247; G02B 5/04; G02B 19/0061; G02B 19/0009; G02B 19/0066; G02B 27/225; G02B 27/22; G02B 27/4205; F21V 7/00; G09G 3/3406; G09G 3/3413; G09G 3/342; G09G 2320/0233; G09F 13/04; G09F 13/18; F21Y 2115/10
See application file for complete search history.

(56) References Cited

U.S. PATENT DOCUMENTS

| | | | |
|---|---|---|---|
| 5,615,024 A | 3/1997 | May et al. | |
| 5,617,248 A | 4/1997 | Takahashi et al. | |
| 5,721,598 A | 2/1998 | Smith | |
| 5,729,311 A | 3/1998 | Broer et al. | |
| 5,926,294 A | 7/1999 | Sato et al. | |
| 6,158,884 A | 12/2000 | Lebby et al. | |
| 6,295,104 B1 | 9/2001 | Egawa et al. | |
| 6,437,920 B1 | 8/2002 | Wohlstadter | |
| 6,490,393 B1 | 12/2002 | Zhou | |
| 6,509,948 B2 | 1/2003 | Suzuki | |
| 6,580,529 B1 | 6/2003 | Amitai et al. | |
| 6,667,782 B1 | 12/2003 | Taira et al. | |
| 6,667,819 B2 | 12/2003 | Nishikawa et al. | |
| 6,718,093 B2 | 4/2004 | Zhou | |
| 6,980,271 B2 | 12/2005 | Fujishiro | |
| 7,044,628 B2 | 5/2006 | Choi et al. | |
| 7,518,663 B2 | 4/2009 | Cornelissen | |
| 7,626,643 B2 | 12/2009 | Ijzerman et al. | |
| 7,742,120 B2 | 6/2010 | Bayley et al. | |
| 7,773,849 B2 | 8/2010 | Shani | |
| 7,859,947 B2 | 12/2010 | Kawai | |
| 7,903,332 B2 | 3/2011 | De Zwart et al. | |
| 8,026,997 B2 | 9/2011 | Feng | |
| 8,491,816 B2 | 7/2013 | Hong et al. | |
| 8,681,423 B1 | 3/2014 | Gibson et al. | |
| 8,870,430 B2 | 10/2014 | Kamikatano et al. | |
| 8,915,635 B2 | 12/2014 | Fiorentino et al. | |
| 9,128,226 B2 | 9/2015 | Fattal et al. | |
| 9,557,466 B2 * | 1/2017 | Fattal | G02B 6/0068 |
| 2002/0008834 A1 | 1/2002 | Suzuki | |
| 2002/0075445 A1 | 6/2002 | Dabrowski et al. | |
| 2004/0156182 A1 | 8/2004 | Hatjasalo et al. | |
| 2004/0156589 A1 | 8/2004 | Gunn et al. | |
| 2004/0240232 A1 | 12/2004 | Choi et al. | |
| 2005/0041174 A1 | 2/2005 | Numata et al. | |
| 2005/0073627 A1 | 4/2005 | Akiyama | |
| 2005/0123229 A1 | 6/2005 | Huck et al. | |
| 2005/0140832 A1 | 6/2005 | Goldman et al. | |
| 2005/0201122 A1 | 9/2005 | Shinohara et al. | |
| 2005/0264717 A1 | 12/2005 | Chien et al. | |
| 2006/0083476 A1 | 4/2006 | Winkler | |
| 2006/0104570 A1 | 5/2006 | Rausch | |
| 2007/0058394 A1 | 3/2007 | Yu | |
| 2007/0129864 A1 | 6/2007 | Tanaka et al. | |
| 2007/0213955 A1 | 9/2007 | Ishida et al. | |
| 2007/0236801 A1 | 10/2007 | Cha et al. | |
| 2007/0279367 A1 | 12/2007 | Kitai | |
| 2007/0298533 A1 | 12/2007 | Yang et al. | |
| 2008/0186334 A1 * | 8/2008 | Seetzen | G09G 3/3413 345/690 |
| 2008/0204663 A1 | 8/2008 | Balogh | |
| 2008/0204873 A1 | 8/2008 | Daniell | |
| 2008/0225393 A1 | 9/2008 | Rinko | |
| 2008/0285307 A1 | 11/2008 | Aylward et al. | |
| 2009/0016168 A1 | 1/2009 | Smith | |
| 2009/0091837 A1 | 4/2009 | Chao et al. | |
| 2009/0207342 A1 | 8/2009 | Yamaguchi et al. | |
| 2009/0213300 A1 | 8/2009 | Daiku | |
| 2009/0244706 A1 | 10/2009 | Levola et al. | |
| 2009/0290837 A1 | 11/2009 | Chen et al. | |
| 2009/0322986 A1 | 12/2009 | Wei et al. | |
| 2010/0039832 A1 | 2/2010 | Ahlgren et al. | |
| 2010/0103485 A1 | 4/2010 | Haussler | |
| 2010/0118117 A1 | 5/2010 | Kroll et al. | |
| 2010/0123952 A1 | 5/2010 | Chen et al. | |
| 2010/0207964 A1 | 8/2010 | Kimmel et al. | |
| 2010/0284085 A1 | 11/2010 | Laakkonen | |
| 2010/0289870 A1 | 11/2010 | Leister | |
| 2010/0302798 A1 | 12/2010 | Papakonstantinou et al. | |
| 2010/0302803 A1 | 12/2010 | Bita et al. | |
| 2011/0002143 A1 | 1/2011 | Saarikko et al. | |
| 2011/0141395 A1 * | 6/2011 | Yashiro | G02B 6/0036 349/62 |
| 2011/0149596 A1 | 6/2011 | Lv et al. | |
| 2011/0157667 A1 | 6/2011 | Lacoste et al. | |
| 2011/0182570 A1 | 7/2011 | Yeh | |
| 2011/0241573 A1 | 10/2011 | Tsai et al. | |
| 2011/0242837 A1 | 10/2011 | Cornelissen et al. | |
| 2011/0254916 A1 | 10/2011 | Fan et al. | |
| 2011/0304784 A1 | 12/2011 | Hirota et al. | |
| 2011/0308445 A1 | 12/2011 | Avda | |
| 2012/0008067 A1 * | 1/2012 | Mun | G02B 6/003 349/65 |
| 2012/0013962 A1 | 1/2012 | Subbaraman et al. | |
| 2012/0075698 A1 | 3/2012 | Minami | |
| 2012/0113678 A1 | 5/2012 | Cornelissen et al. | |
| 2012/0120213 A1 | 5/2012 | Ohyama et al. | |
| 2012/0127573 A1 | 5/2012 | Robinson et al. | |
| 2012/0127751 A1 | 5/2012 | Kimmel et al. | |
| 2012/0176665 A1 | 7/2012 | Song et al. | |
| 2012/0249934 A1 | 10/2012 | Li et al. | |
| 2012/0250141 A1 | 10/2012 | Chen | |
| 2012/0281950 A1 | 11/2012 | Fattal et al. | |
| 2013/0057539 A1 | 3/2013 | Kim | |
| 2013/0082980 A1 | 4/2013 | Gruhlke et al. | |
| 2013/0201723 A1 | 8/2013 | Gourlay | |
| 2014/0111856 A1 | 4/2014 | Brug et al. | |
| 2014/0293759 A1 | 10/2014 | Taff et al. | |
| 2014/0300840 A1 | 10/2014 | Fattal et al. | |
| 2014/0300947 A1 | 10/2014 | Fattal et al. | |
| 2014/0300960 A1 | 10/2014 | Santori et al. | |
| 2015/0016777 A1 | 1/2015 | Abovitz et al. | |
| 2015/0036068 A1 | 2/2015 | Fattal et al. | |
| 2015/0355403 A1 | 12/2015 | Santori et al. | |
| 2016/0018582 A1 | 1/2016 | Fiorentino et al. | |

FOREIGN PATENT DOCUMENTS

| | | |
|---|---|---|
| CN | 101017218 A | 8/2007 |
| CN | 101750664 A | 6/2010 |
| CN | 202126538 | 1/2012 |

(56) References Cited

FOREIGN PATENT DOCUMENTS

| | | |
|---|---|---|
| EP | 1016817 A1 | 7/2000 |
| JP | H08-190095 A | 7/1996 |
| JP | 1997943594 A | 2/1997 |
| JP | 11-326545 A | 11/1999 |
| JP | 2000267041 A | 9/2000 |
| JP | 2001201717 A | 7/2001 |
| JP | 2001215444 A | 8/2001 |
| JP | 2002031788 A | 1/2002 |
| JP | 2004077897 A | 3/2004 |
| JP | 2004302186 A | 10/2004 |
| JP | 2008164963 A | 7/2006 |
| JP | 2007033200 A | 2/2007 |
| JP | 2008083411 A | 4/2008 |
| JP | 2008083532 A | 4/2008 |
| JP | 2009053499 A | 3/2009 |
| JP | 2009288718 A | 12/2009 |
| JP | 2009295598 A | 12/2009 |
| JP | 2010102188 A | 5/2010 |
| JP | 2010237416 A | 10/2010 |
| JP | 2011029161 A | 2/2011 |
| JP | 2011090020 A | 5/2011 |
| JP | 2011129251 A | 6/2011 |
| JP | 2011133677 A | 7/2011 |
| JP | 2011170178 A | 9/2011 |
| JP | 2011232717 A | 11/2011 |
| JP | 2011247993 A | 12/2011 |
| JP | 2011253028 A | 12/2011 |
| JP | 2012022085 A | 2/2012 |
| WO | 199908257 A1 | 2/1999 |
| WO | 2012069071 A1 | 5/2012 |
| WO | WO 2013/180725 * 12/2013 | ............. G02B 27/22 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Son et al., "Three-Dimensional Imaging Methods Based on Multiview Images," IEEE/OSA Journal of Display Technology, Sep. 2005, pp. 125-140, vol. 1, No. 1.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal et al., "A multi-directional backlight for a wide-angle, glasses-free three-dimensional display," Nature, Mar. 21, 2013, pp. 348-351, vol. 495, Macmillan Publishers Limited, 2013.

* cited by examiner

MULTIBEAM DIFFRACTION GRATING-BASED COLOR BACKLIGHTING

CROSS-REFERENCE TO RELATED APPLICATIONS

This application is a continuation application of and claims the benefit of priority to U.S. patent application Ser. No. 14/814,244, filed Jul. 30, 2015, which claims the benefit of priority to prior International Application No. PCT/US2014/048923, filed Jul. 30, 2014, the entire contents of which are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the applicability limitations of passive displays associated with light emission, many passive displays are coupled to an external light source. The coupled light source may allow these otherwise passive displays to emit light and function substantially as an active display. Examples of such coupled light sources are backlights. Backlights are light sources (often so-called 'panel' light sources) that are placed behind an otherwise passive display to illuminate the passive display. For example, a backlight may be coupled to an LCD or an EP display. The backlight emits light that passes through the LCD or the EP display. The light emitted by the backlight is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide electronic display backlighting using multibeam diffractive coupling of different colors of light. In particular, backlighting of an electronic display described herein employs a multibeam diffraction grating and a plurality of different colored light sources that are laterally displaced from one another. The multibeam diffraction grating is used to couple light of different colors produced by the light sources out of a light guide and to direct the coupled-out light of different colors in a viewing direction of the electronic display. The coupled-out light directed in the viewing direction by the multibeam diffraction grating includes a plurality of light beams that have different principal angular directions and different colors from one another, according to various examples of the principles described herein. In some examples, the light beams having the different principal angular directions (also referred to as 'the differently directed light beams') and the different colors may be employed to display three-dimensional (3-D) information. For example, the differently directed, different color light beams produced by the multibeam diffraction grating may be modulated and serve as pixels of a 'glasses free' 3-D electronic display.

Figure 1:
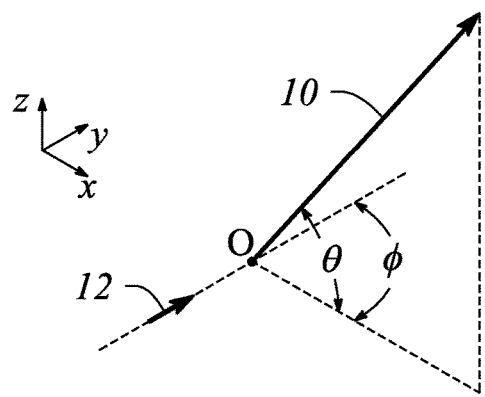
FIG. 1 illustrates a graphical view of angular components $\{\theta, \phi\}$ of a light beam having a particular principal angular direction, according to an example of the principles describe herein.

According to various examples, the multibeam diffraction grating produces the plurality of light beams having a corresponding plurality of different, spatially separated angles (i.e., different principal angular directions). In particular, a light beam produced by the multibeam diffraction grating has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam, herein. By definition, the elevation angle $\theta$ is an angle in a vertical plane (e.g., perpendicular to a plane of the multibeam diffraction grating) while the azimuth angle $\phi$ is an angle in a horizontal plane (e.g., parallel to the multibeam diffraction grating plane). FIG. 1 illustrates the angular components $\{\theta, \phi\}$ of a light beam 10 having a particular principal angular direction, according to an example of the principles describe herein. In addition, the light beam is emitted or emanates from a particular point, by definition herein. That is, by definition, the light beam has a central ray associated with a particular point of origin within the multibeam diffraction grating. FIG. 1 also illustrates the light beam point of origin O. An example propagation direction of incident light is illustrated in FIG. 1 using a bold arrow 12.

According to various examples, characteristics of the multibeam diffraction grating and the features thereof (i.e., 'diffractive features') may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove or ridge width), and an orientation of the grating. In some examples, the various characteristics used for control may be characteristics that are local to a vicinity of the point of origin of a light beam.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. For example, the diffraction grating may be a 2-D array of bumps on a material surface.

As such, and by definition herein, the diffraction grating is a structure that provides diffraction of light incident on the diffraction grating. If the light is incident on the diffraction grating from a light guide, the provided diffraction may result in, and thus be referred to as, 'diffractive coupling' in that the diffraction grating may couple light out of the light guide by diffraction. The diffraction grating also redirects or changes an angle of the light by diffraction (i.e., a diffractive angle). In particular, as a result of diffraction, light leaving the diffraction grating (i.e., diffracted light) generally has a different propagation direction than a propagation direction of the incident light. The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Specifically herein, 'diffractive coupling' is defined as coupling of an electromagnetic wave (e.g., light) across a boundary between two materials as a result of diffraction (e.g., by a diffraction grating). For example, a diffraction grating may be used to couple out light propagating in a light guide by diffractive coupling across a boundary of the light guide. Similarly, 'diffractive redirection' is the redirection or change in propagation direction of light as a result of diffraction, by definition. Diffractive redirection may occur at the boundary between two materials if the diffraction occurs at that boundary (e.g., the diffraction grating is located at the boundary).

Further by definition herein, the features of a diffraction grating are referred to as 'diffractive features' and may be one or more of at, in and on a surface (e.g., a boundary between two materials). The surface may be a surface of a light guide, for example. The diffractive features may include any of a variety of structures that diffract light including, but not limited to, one or more of grooves, ridges, holes and bumps at, in or on the surface. For example, the multibeam diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a rectangular profile, a triangular profile and a saw tooth profile.

By definition herein, a 'multibeam diffraction grating' is a diffraction grating that produces a plurality of light beams. In some examples, the multibeam diffraction grating may be or include a 'chirped' diffraction grating. The light beams of the plurality produced by the multibeam diffraction grating may have different principal angular directions denoted by the angular components $\{\theta, \phi\}$, as described above. In particular, according to various examples, each of the light beams may have a predetermined principal angular direction as a result of diffractive coupling and diffractive redirection of incident light by the multibeam diffraction grating. For example, the multibeam diffraction grating may produce eight light beams in eight different principal directions. According to various examples, the different principal angular directions of the various light beams are determined by a combination of a grating pitch or spacing and an orientation or rotation of the features of the multibeam diffraction grating at the points of origin of the light beams relative to a propagation direction of light incident on the multibeam diffraction grating.

Further herein, a 'light guide' is defined as a structure that guides light within the structure using total internal reflection. In particular, the light guide may include a core that is substantially transparent at an operational wavelength of the light guide. In some examples, the term 'light guide' generally refers to a dielectric optical waveguide that provides total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and substantially parallel to one another in a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

Herein, a 'light source' is defined as a source of light (e.g., an apparatus or device that emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least a one of the light sources produces light having a color or equivalently a wavelength that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., produce a color of light that is different between the at least two light sources). Hence, by definition herein, a plurality of light sources of different colors may include a first light source that produces a first color of light and a second light source that produces a second color of light, where the second color differs from the first color.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 2A:
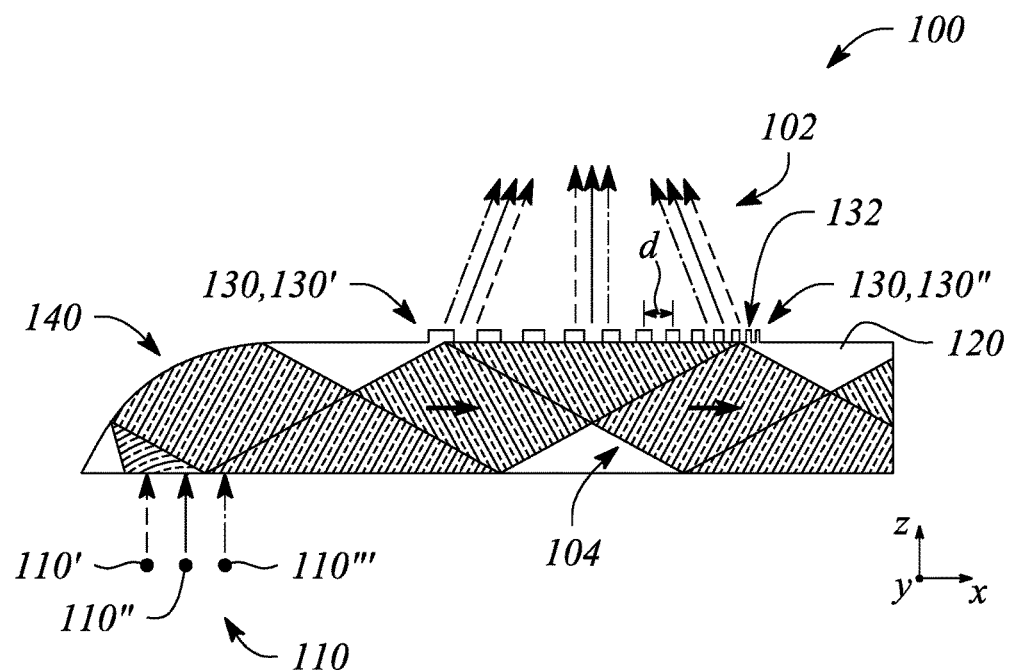
FIG. 2A illustrates a cross sectional view of a multibeam diffraction grating-based color backlight, according to an example consistent with the principles described herein.
Figure 2B:
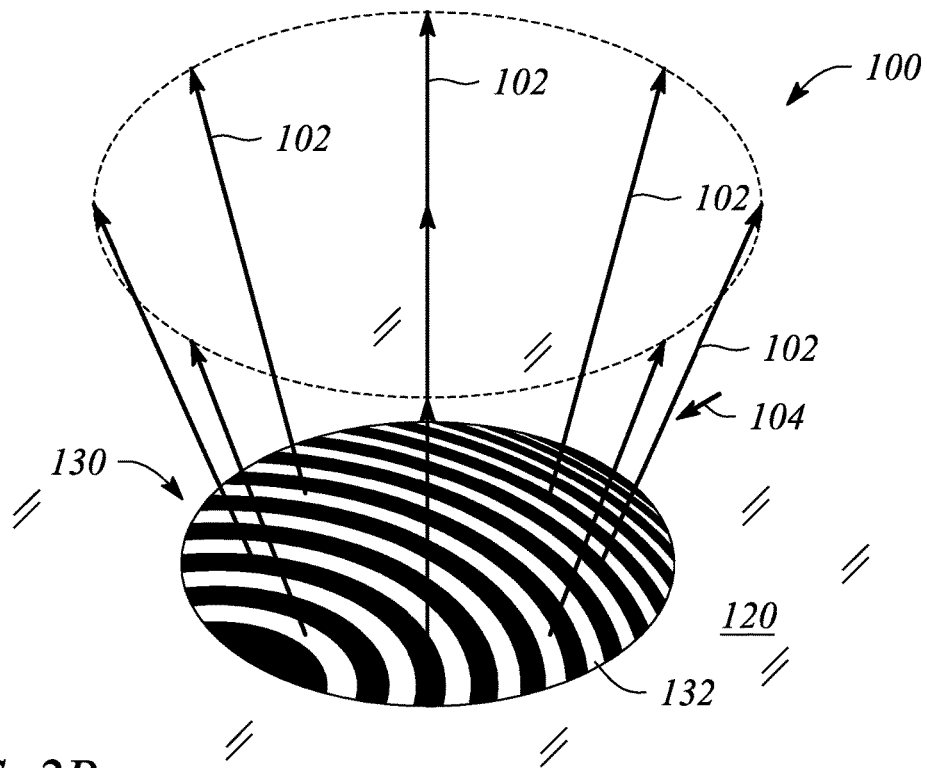
FIG. 2B illustrates a perspective view of a surface of the multibeam diffraction grating-based color backlight illustrated in FIG. 2A, according to an example consistent with the principles described herein.
Figure 2C:
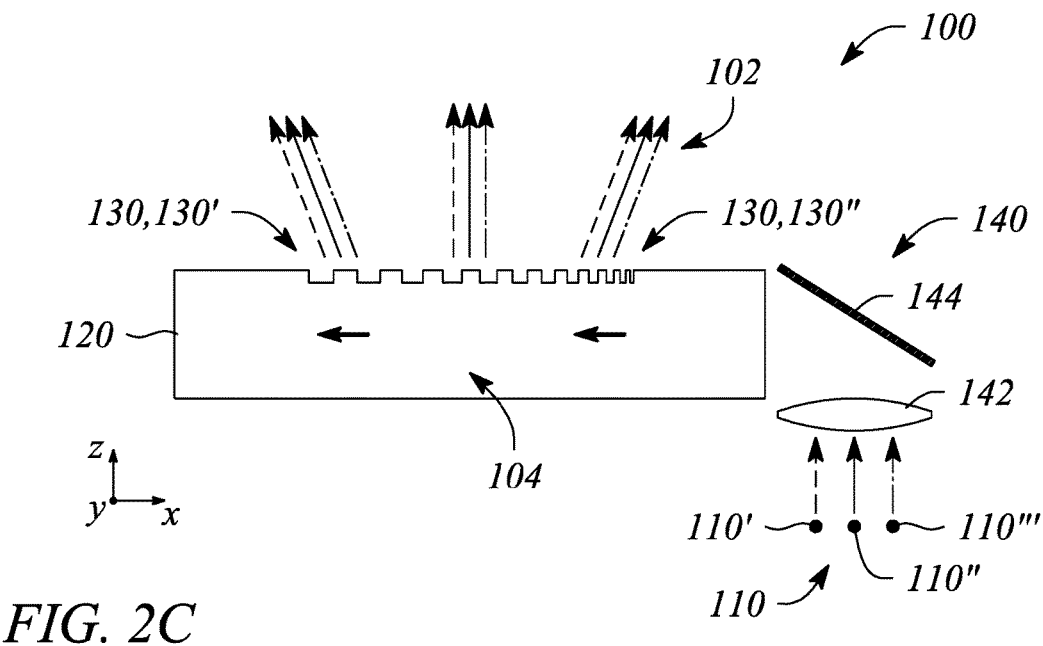
FIG. 2C illustrates a cross sectional view of a multibeam diffraction grating-based color backlight, according to another example consistent with the principles described herein.

FIG. 2A illustrates a cross sectional view of a multibeam diffraction grating-based color backlight 100, according to an example consistent with the principles described herein. FIG. 2B illustrates a perspective view of a surface of the multibeam diffraction grating-based color backlight 100 illustrated in FIG. 2A, according to an example consistent with the principles described herein. FIG. 2C illustrates a cross sectional view of a multibeam diffraction grating-based color backlight 100, according to another example consistent with the principles described herein.

According to various examples, the multibeam diffraction grating-based color backlight 100 is configured to provide a plurality of light beams 102 directed out and away from the multibeam diffraction grating-based color backlight 100 in different predetermined directions. Further, various light beams 102 of the light beam plurality represent or include different colors of light. In some examples, the plurality of light beams 102 of different colors and different directions forms a plurality of pixels of an electronic display. In some examples, the electronic display is a so-called 'glasses free' three-dimensional (3-D) display (e.g., a multiview display).

In particular, a light beam 102 of the light beam plurality provided by the multibeam diffraction grating-based color backlight 100 is configured to have a different principal angular direction from other light beams 102 of the light beam plurality (e.g., see FIGS. 2A-2C), according to various examples. Further, the light beam 102 may have a relatively narrow angular spread. As such, the light beam 102 may be directed away from the multibeam diffraction grating-based color backlight 100 in a direction established by the principal angular direction of the light beam 102.

In addition, light beams 102 of the light beam plurality provided by the multibeam diffraction grating-based color backlight 100 have or represent different colors of light. In some examples, the different colors of the light beams 102 may represent colors in a set of colors (e.g., a color palette). Further, according to some examples, light beams 102 representing each of the colors in the set of colors may have substantially equal principal angular directions. In particular, for a particular principal angular direction, there may be a set of light beams 102 representing each of the colors in the set of colors. In some examples, each principal angular direction of the plurality of light beams 102 may include a set of light beams 102 representing each the colors of the set of colors. In some examples, the light beams 102 of different colors (e.g., of the set of colors) and different principal angular directions may be modulated (e.g., by a light valve as described below). The modulation of the different color light beams 102 directed in different directions away from the multibeam diffraction grating-based color backlight 100 may be particularly useful as pixels in color 3-D electronic display applications.

The multibeam diffraction grating-based color backlight 100 includes a plurality of light sources 110 of different colors. In particular, a light source 110 of the light source plurality is configured to produce light of a color (i.e., an optical wavelength) that differs from a color of light produced by other light sources 110 of the light source plurality, by definition herein. For example, a first light source 110' of the light source plurality may produce light of a first color (e.g., red), a second light source 110″ of the light source plurality may produce light of a second color (e.g., green), a third light source 110‴ of the light source plurality may produce light of a third color (e.g., blue), and so on.

In various examples, the plurality of light sources 110 of different colors may include light sources 110 that represent substantially any source of light including, but not limited to, one or more of a light emitting diode (LED), a fluorescent light, and a laser. For example, the plurality of light sources 110 may each include a plurality of LEDs. In some examples, one or more of the light sources 110 of the light source plurality may produce a substantially monochromatic light having a narrowband spectrum denoted by a specific color. In particular, the color of the monochromatic light may be a primary color of a predetermined color gamut or color model (e.g., a red-green-blue (RGB) color model), according to some examples. For example, the first light source 110′ of the light source plurality may be a red LED and the monochromatic light produced by the first light source 110′ may be substantially the color red. In this example, the second light source 110″ may be a green LED and the monochromatic light produced by the second light source 110″ may be substantially green in color. Further, the third light source 110‴ may be a blue LED and the monochromatic light produced by the third light source 110‴ may be substantially blue in color, in this example.

In other examples, the light provided by one or more of the light sources 110 of the plurality may have a relatively broadband spectrum (i.e., may not be monochromatic light). For example, a fluorescent light source or similar broadband light source that produces substantially white light may be employed as part of the light source plurality. In some examples when a broadband light source is used, the white light produced by the broadband light source may be 'converted' into a respective color (e.g., red, green, blue, etc.) of the different colors of the light source plurality using a color filter or a similar mechanism (e.g., a prism). The broadband light source combined with the color filter effectively produces light of a respective color of the color filter, for example. In particular, the respective color may be a color of the different colors of the plurality of light sources 110 and the 'converted' broadband light source that includes the color filter may be a light source 110 of the plurality of light sources 110 of different colors, according to various examples. Note that the colors red, green and blue are employed herein by way of discussion and not limitation. Other colors instead of or in addition to any or all of red, green and blue may be used as the different colors of the light sources 110, for example.

According to various examples, the light sources 110 of the light source plurality are laterally displaced from one another, as illustrated in FIGS. 2A and 2C. For example, the light sources 110 may be laterally displaced from one another along a particular axis or direction. In particular, as illustrated in FIGS. 2A and 2C, the first light source 110′ is laterally displaced to the left along an x-axis relative to the second light source 110″. Further, the third light source 110‴ is laterally displaced to the right along the x-axis relative to the second light source 110″, as illustrated.

According to various examples, the multibeam diffraction grating-based color backlight 100 further includes a plate light guide 120 configured to guide light 104 that enters the plate light guide 120. The plate light guide 120 is configured to guide the light 104 of the different colors produced by the light sources 110 of the light source plurality, according to various examples. In some examples, the plate light guide 120 guides the light 104 using total internal reflection. For example, the plate light guide 120 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the plate light guide 120, for example.

In some examples, the plate light guide 120 may be a slab or plate optical waveguide that is an extended, substantially planar sheet of optically transparent material (e.g., as illustrated in cross section in FIGS. 2A and 2C). The substantially planar sheet of dielectric material is configured to guide the light 104 through total internal reflection. In some examples, the plate light guide 120 may include a cladding layer on at least a portion of a surface of the plate light guide 120 (not illustrated). The cladding layer may be used to further facilitate total internal reflection, for example. According to various examples, the optically transparent material of the plate light guide 120 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.).

According to various examples, the light produced by the light sources 110 is coupled into an end of the plate light guide 120 to propagate and be guided along a length or propagation axis of the plate light guide 120. For example, as illustrated in FIGS. 2A and 2C, the guided light 104 may propagate along the propagation axis of the plate light guide 120 in a generally horizontal direction (i.e., along the x-axis). Propagation of the guided light 104 in a general propagation direction along the propagation axis is illustrated from left to right in FIG. 2A as several bold horizontal arrows (i.e., pointing from left to right). FIG. 2C illustrates propagation of the guided light 104 from right to left, also as several bold horizontal arrows. The propagation of the guided light 104 illustrated by the bold horizontal arrows along the x-axis in FIGS. 2A and 2C represents various propagating optical beams within the plate light guide 120. In particular, the propagating optical beams may represent plane waves of propagating light associated with one or more of the optical modes of the plate light guide 120, for example. The propagating optical beams of the guided light 104 may propagate along the propagation axis by 'bouncing' or reflecting off of walls of the plate light guide 120 at an interface between the material (e.g., dielectric) of the plate light guide 120 and the surrounding medium due to total internal reflection, according to various examples.

According to various examples, lateral displacement of the light sources 110 of the light source plurality determines a relative angle of propagation of the various propagating optical beams of the guided light 104 within the plate light guide 120 (i.e., in addition to propagation along the propagation axis). In particular, lateral displacement of the first light source 110′ relative to the second light source 110″ (e.g., to the left in FIG. 2A and to the right in FIG. 2C), may result in a propagating optical beam associated with the first light source 110′ having a propagation angle within the plate light guide 120 that is smaller or 'shallower' that a propagation angle of a propagating optical beam associated with the second light source 110″. Likewise, the lateral displacement of the third light source 110‴ relative to the second light source 110″, (e.g., to the right in FIG. 2A and to the left in FIG. 2C) may result in a larger or 'steeper' propagation angle of the propagating optical beam associated with the third light source 110''' relative to the propagation angle of the propagating optical beam of the second light source 110". Hence a relative lateral displacement of the light sources 110 of the light source plurality is used to control or determine the propagation angle of the propagating optical beam associated with each of the light sources 110.

In FIGS. 2A and 2C, the light of a color associated with the second light source 110" is illustrated with a solid line, while light of colors associated with the first and third light sources 110', 110''' are illustrated respectively with different dashed lines. As illustrated by the respective solid and the different dashed lines in FIGS. 2A and 2C, light of different colors is emitted by the first, second and third light sources 110', 110", 110'''. The light of the different colors is coupled into the plate light guide 120 and propagates along the plate light guide propagation axis as the guided light 104 (e.g., as illustrated by the bold horizontal arrows). In addition, each of the different colors of the guided light 104 coupled into the plate light guide 120 propagates along the propagation axis with a different propagation angle determined by the lateral displacement of respective ones of the first, second and third light sources 110', 110", 110'''. Propagation of the guided light 104 with the various different propagation angles is illustrated as a zigzag, crosshatched region in FIG. 2A. Further, in FIGS. 2A and 2C, light beams 102 of the different colors of light associated with the first, second and third light sources 110', 110", 110''' are depicted using corresponding solid and variously dashed lines.

According to various examples, the multibeam diffraction grating-based color backlight 100 further includes a multibeam diffraction grating 130. The multibeam diffraction grating 130 is located at a surface of the plate light guide 120 and is configured to diffractively couple out a portion or portions of the guided light 104 from the plate light guide 120 by or using diffractive coupling. In particular, the coupled-out portion of the guided light 104 is diffractively redirected away from the light guide surface as the plurality of light beams 102 of different colors (i.e., representing the different colors of the light sources 110). Further, light beams 102 of different colors are redirected away from the light guide surface in different principal angular directions by the multibeam diffraction grating 130. As such, the light beams 102 representing guided light 104 from the second light source 110" (solid line arrow) have different principal angular directions when diffractively coupled out, as illustrated. Similarly, the light beams 102 representing guided light 104 from each of the first light source 110' and the third light source 110''' (various dashed line arrows) respectively also have different principal angular directions. However, some of the light beams 102 from each of the laterally displaced light sources 110', 110", 110''' may have a substantially similar principal angular directions, according to various examples.

In general, the light beams 102 produced by the multibeam diffraction grating 130 may be either diverging or converging, according to various examples. In particular, FIG. 2A illustrates the plurality of light beams 102 that are converging, while FIG. 2C illustrates the light beams 102 of the plurality that are diverging. Whether the light beams 102 are converging (FIG. 2A) or diverging (FIG. 2C) is determined by a propagation direction of the guided light 104 relative to a characteristic of the multibeam diffraction grating 130 (e.g., a chirp direction), according to various examples. In some examples where the light beams 102 are diverging, the diverging light beams 102 may appear to be diverging from a 'virtual' point (not illustrated) located some distance below or behind the multibeam diffraction grating 130. Similarly, the converging light beams 102 may converge or cross at a virtual point (not illustrated) above or in front of the multibeam diffraction grating 130, according to some examples.

According to various examples, the multibeam diffraction grating 130 includes a plurality of diffractive features 132 that provide diffraction. The provided diffraction is responsible for the diffractive coupling of the guided light 104 out of the plate light guide 120. For example, the multibeam diffraction grating 130 may include one or both of grooves in a surface of the plate light guide 120 and ridges protruding from the light guide surface that serve as the diffractive features 132. The grooves and ridges may be arranged parallel to one another and, at least at some point, perpendicular to a propagation direction of the guided light 104 that is to be coupled out by the multibeam diffraction grating 130.

In some examples, the grooves and ridges may be etched, milled or molded into the surface or applied on the surface. As such, a material of the multibeam diffraction grating 130 may include a material of the plate light guide 120. As illustrated in FIG. 2A, for example, the multibeam diffraction grating 130 includes substantially parallel ridges that protrude from the surface of the plate light guide 120. In FIG. 2C, the multibeam diffraction grating 130 includes substantially parallel grooves that penetrate the surface of the plate light guide 120. In other examples (not illustrated), the multibeam diffraction grating 130 may be a film or layer applied or affixed to the light guide surface. The multibeam diffraction grating 130 may be deposited on the light guide surface, for example.

The multibeam diffraction grating 130 may be arranged in a variety of configurations at, on or in the surface of the plate light guide 120, according to various examples. For example, the multibeam diffraction grating 130 may be a member of a plurality of gratings (e.g., multibeam diffraction gratings) arranged in columns and rows across the light guide surface. The rows and columns of multibeam diffraction gratings 130 may represent a rectangular array of multibeam diffraction gratings 130, for example. In another example, the plurality of multibeam diffraction gratings 130 may be arranged as another array including, but not limited to, a circular array. In yet another example, the plurality of multibeam diffraction gratings 130 may be distributed substantially randomly across the surface of the plate light guide 120.

According to some examples, the multibeam diffraction grating 130 may include a chirped diffraction grating 130. By definition, the chirped diffraction grating 130 is a diffraction grating exhibiting or having a diffraction pitch or spacing d of the diffractive features that varies across an extent or length of the chirped diffraction grating 130, as illustrated in FIGS. 2A-2C. Herein, the varying diffraction spacing d is referred to as a 'chirp'. As a result, the guided light 104 that is diffractively coupled out of the plate light guide 120 exits or is emitted from the chirped diffraction grating 130 as the light beam 102 at different diffraction angles corresponding to different points of origin across the chirped diffraction grating 130. By virtue of the chirp, the chirped diffraction grating 130 may produce the plurality of light beams 102 having different principal angular directions.

Further, the diffraction angle that establishes the principal angular direction of the light beams 102 is also a function of a wavelength or color and an angle of incidence of the guided light 104. As such, a principal angular direction of a light beam 102 of a color corresponding to a respective light source 110 is a function of the lateral displacement of the respective light source 110, according to various examples. In particular, as is discussed above, the various light sources 110 of the light source plurality are configured to produce light of different colors. Further, the light sources 110 are laterally displaced from one another to produced different propagation angles of the guided light 104 within the plate light guide 120. A combination of the different propagation angles (i.e., angles of incidence) of the guided light 104 due to respective lateral displacements of the light sources 110 and the different colors of the guided light 104 produced by the light sources 110 results in a plurality of different color light beams 102 having substantially equal principal angular directions, according to various examples. For example, the light beams 102 of different colors (i.e., sets of different colored light beams) having substantially equal principal angular directions are illustrated in FIGS. 2A-2C using a combination of solid and dashed lines.

In some examples, the chirped diffraction grating 130 may have or exhibit a chirp of the diffractive spacing d that varies linearly with distance. As such, the chirped diffraction grating 130 may be referred to as a 'linearly chirped' diffraction grating. FIGS. 2A and 2C illustrates the multibeam diffraction grating 130 as a linearly chirped diffraction grating, for example. As illustrated, the diffractive features 132 are closer together at a second end 130" of the multibeam diffraction grating 130 than at a first end 130'. Further, the diffractive spacing d of the illustrated diffractive features 132 varies linearly from the first end 130' to the second end 130".

In some examples, the light beams 102 of different colors produced by coupling guided light 104 out of the plate light guide 120 using the multibeam diffraction grating 130 including the chirped diffraction grating may converge (i.e., be converging light beams 102) when the guided light 104 propagates in a direction from the first end 130' to the second end 130" (e.g., as illustrated in FIG. 2A). Alternatively, diverging light beams 102 of different colors may be produced when the guided light 104 propagates from the second end 130" to the first end 130' (e.g., as illustrated in FIG. 2C), according to other examples.

In another example (not illustrated), the chirped diffraction grating 130 may exhibit a non-linear chirp of the diffractive spacing d. Various non-linear chirps that may be used to realize the chirped diffraction grating 130 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle (or sawtooth) chirp, may also be employed.

According to some examples, the diffractive features 132 within the multibeam diffraction grating 130 may have varying orientations relative to an incident direction of the guided light 104. In particular, an orientation of the diffractive features 132 at a first point within the multibeam diffraction grating 130 may differ from an orientation of the diffractive features 132 at another point. As described above, angular components of the principal angular direction $\{\theta, \phi\}$ of the light beam 102 are determined by or correspond to a combination of a local pitch (i.e., diffractive spacing d) and an azimuthal orientation angle of the diffractive features 132 at a point of origin of the light beam 102, according to some examples. Further, the azimuthal component $\phi$ of the principal angular direction $\{\theta, \phi\}$ of the light beam 102 may be substantially independent of a color of the light beam 102 (i.e., substantially equal for all colors), according to some examples. In particular, a relationship between the azimuthal component $\phi$ and the azimuthal orientation angle of the diffractive features 132 may be substantially the same for all colors of the light beams 102, according to some examples. As such, the varying an orientation of the diffractive features 132 within the multibeam diffraction grating 130 may produce different light beams 102 having different principal angular directions $\{\theta, \phi\}$ regardless of a color of the light beam 102, at least in terms of their respective azimuthal components $\phi$.

In some examples, the multibeam diffraction grating 130 may include diffractive features 132 that are either curved or arranged in a generally curved configuration. For example, the diffractive features 132 may include one of curved grooves and curved ridges that are spaced apart from one another along radius of the curve. FIG. 2B illustrates curved diffractive features 132 as curved, spaced apart ridges, for example. At different points along the curve of the diffractive features 132, an 'underlying diffraction grating' of the multibeam diffraction grating 130 associated with the curved diffractive features 132 has a different azimuthal orientation angle. In particular, at a given point along the curved diffractive features 132 the curve has a particular azimuthal orientation angle that generally differs from another point along the curved diffractive feature 132. Further, the particular azimuthal orientation angle results in a corresponding principal angular direction $\{\theta, \phi\}$ of a light beam 102 emitted from the given point. In some examples, the curve of the diffractive feature(s) (e.g., groove, ridge, etc.) may represent a section of a circle. The circle may be coplanar with the light guide surface. In other examples, the curve may represent a section of an ellipse or another curved shape, e.g., that is coplanar with the light guide surface.

In other examples, the multibeam diffraction grating 130 may include diffractive features 132 that are 'piece-wise' curved. In particular, while the diffractive feature may not describe a substantially smooth or continuous curve per se, at different points along the diffractive feature within the multibeam diffraction grating 130, the diffractive feature 132 still may be oriented at different angles with respect to the incident direction of the guided light 104 to approximate a curve. For example, the diffractive feature 132 may be a groove including a plurality of substantially straight segments, each segment of the groove having a different orientation than an adjacent segment. Together, the different angles of the segments may approximate a curve (e.g., a segment of a circle). For example, FIG. 3, which is described below, illustrates an example of piece-wise curved diffractive features 132. In yet other examples, the diffractive features 132 may merely have different orientations relative to the incident direction of the guided light at different locations within the multibeam diffraction grating 130 without approximating a particular curve (e.g., a circle or an ellipse).

In some examples, the multibeam diffraction grating 130 may include both differently oriented diffractive features 132 and a chirp of the diffractive spacing d. In particular, both the orientation and the spacing d between the diffractive features 132 may vary at different points within the multibeam diffraction grating 130. For example, the multibeam diffraction grating 130 may include a curved and chirped diffraction grating 130 having grooves or ridges that are both curved and vary in spacing d as a function of a radius of the curve.

FIG. 2B illustrates the multibeam diffraction grating 130 including diffractive features 132 (e.g., grooves or ridges) that are both curved and chirped (i.e., is a curved, chirped diffraction grating) in or on a surface of the plate light guide 120. The guided light 104 has an incident direction relative to the multibeam diffraction grating 130 and the plate light guide 120 as illustrated in FIG. 2B, by way of example. FIG. 2B also illustrates the plurality of emitted light beams 102 pointing away from the multibeam diffraction grating 130 at the surface of the plate light guide 120. As illustrated, the light beams 102 are emitted in a plurality of different principal angular directions. In particular, the different principal angular directions of the emitted light beams 102 are different in both azimuth and elevation, as illustrated. As discussed above, both the chirp of the diffractive features 132 and the curve of the diffractive features 132 may be substantially responsible for the different principle angular directions of the emitted light beams 102.

Figure 3:
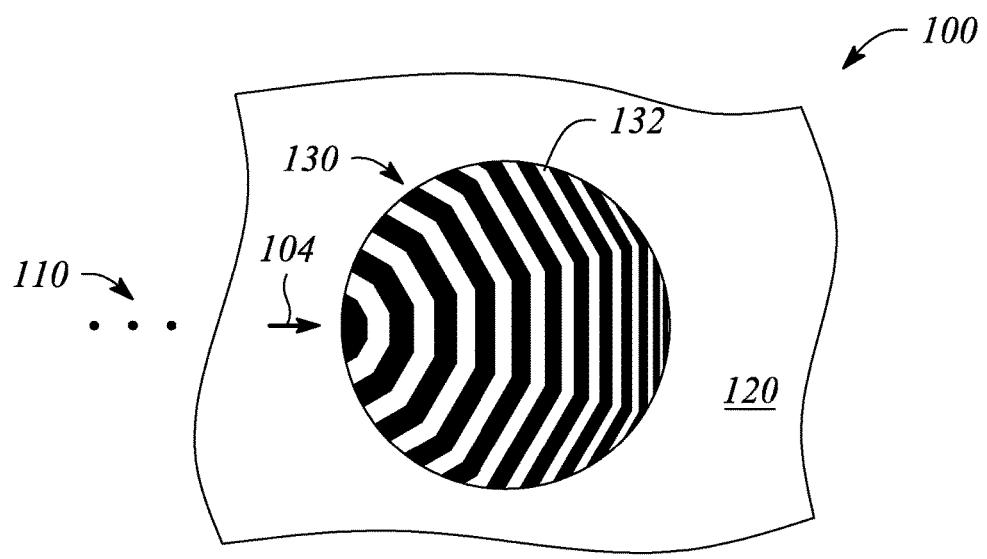
FIG. 3 illustrates a plan view of a multibeam diffraction grating, according to another example consistent with the principles described herein.

FIG. 3 illustrates a plan view of a multibeam diffraction grating 130, according to another example consistent with the principles described herein. As illustrated, the multibeam diffraction grating 130 is on a surface of a plate light guide 120 of a multibeam diffraction grating-based color backlight 100 that also includes a plurality of light sources 110. The multibeam diffraction grating 130 includes diffractive features 132 that are both piece-wise curved and chirped. A bold arrow in FIG. 3 illustrates an example incident direction of the guided light 104.

In some examples, the multibeam diffraction grating-based color backlight 100 may further include a tilted collimator. The tilted collimator may be located between the plurality of light sources 110 and the plate light guide 120, according to various examples. The tilted collimator is configured to tilt light from the light sources 110 and to direct the tilted and collimated light into to the plate light guide 120 as the guided light 104. According to various examples, the tilted collimator may include, but is not limited to a collimating lens in combination with a mirror, a tilted collimating lens or collimating reflector. For example, FIG. 2A illustrates a tilted collimator 140 including a collimating reflector configured to collimate and tilt the light from the light sources 110. FIG. 2C illustrates a tilted collimator 140 that includes a collimating lens 142 and a mirror 144, by way of example and not limitation.

Figure 4A:
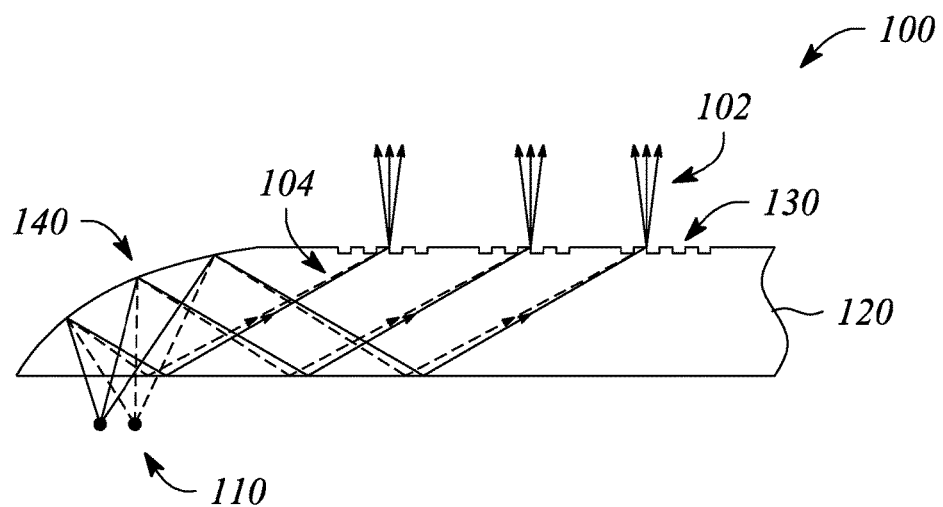
FIG. 4A illustrates a cross sectional view of a multibeam diffraction grating-based color backlight including a tilted collimator, according to another example consistent with the principles described herein.

FIG. 4A illustrates a cross sectional view of a multibeam diffraction grating-based color backlight 100 including a tilted collimator 140, according to another example consistent with the principles described herein. In particular, the tilted collimator 140 is illustrated as a collimating reflector 140 located between the plurality of light sources 110 of different colors and the plate light guide 120. In FIG. 4A, the light sources 110 are laterally displaced from one another in a direction corresponding to a propagation axis of the guided light 104 within the plate light guide 120 (e.g., the x-axis), as illustrated. Further, as illustrated, the multibeam diffraction grating-based color backlight 100 includes a plurality of multibeam diffraction gratings 130 (i.e., a multibeam diffraction grating array) at a surface of the plate light guide 120. Each multibeam diffraction grating 130 is configured to produce a plurality of light beams 102 of different colors and different principal angular directions.

According to various examples, the collimating reflector 140 illustrated in FIG. 4A is configured to collimate light of different colors produced by the light sources 110. The collimating reflector 140 is further configured to direct the collimated light at a tilt angle relative to a top surface and a bottom surface of the plate light guide 120. According to some examples, the tilt angle is both greater than zero and less than a critical angle of total internal reflection within the plate light guide 120. According to various examples, light from a respective light source 110 of the light source plurality may have a corresponding tilt angle determined by both a tilt of the collimating reflector and a lateral displacement of the respective light source 110 relative to a focus or focal point F of the collimating reflector 140.

Figure 4B:
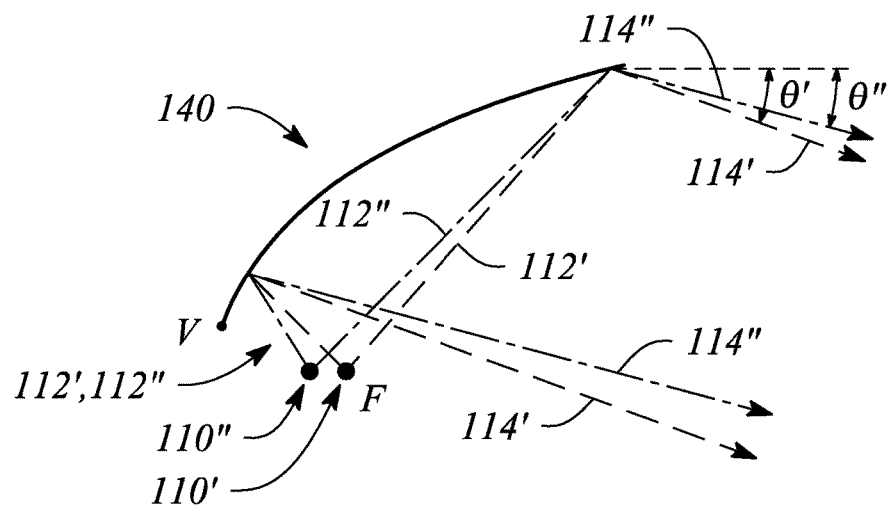
FIG. 4B illustrates a schematic representation of a collimating reflector, according to an example consistent with the principles described herein.

FIG. 4B illustrates a schematic representation of a collimating reflector 140, according to an example consistent with the principles described herein. In particular, FIG. 4B illustrates a first light source 110' (e.g., a green light source) located at the focal point F of the collimating reflector 140. Also illustrated is a second light source 110" (e.g., a red light source) laterally displaced from the first light source 110' along the x-axis, i.e., in a direction corresponding to the propagation axis. Light (e.g., green light) produced by the first light source 110' diverges as a cone of light denoted by rays 112' in FIG. 4B. Similarly, light (e.g., red light) produced by the second light source 110" diverges as a cone of light denoted by rays 112" in FIG. 4B.

Collimated light from the first light source 110' exiting the collimating reflector 140 is denoted by parallel rays 114', while collimated light from the second light source 110" exiting the collimating reflector 140 is denoted by parallel rays 114", as illustrated. Note that the collimating reflector 140 not only collimates the light but also directs or tilts the collimated light downward a non-zero angle. In particular, the collimated light from the first light source 110' is tilted downward at a tilt angle θ' and the collimated light from the second light source 110" is tilted downward at a different tilt angle θ", as illustrated. The difference between the first light source tilt angle θ' and the second light source tilt angle θ" is provided or determined by the lateral displacement of the second light source 110" relative to the first light source 110', according to various examples. Note that the different tilt angles θ', θ" correspond to different propagation angles of the guided light 104 within the plate light guide 120 for the light (e.g., green vs. red) from respective ones of the first and second light sources 110', 110", as illustrated in FIG. 4A.

In some examples, the tilted collimator (e.g., the collimating reflector 140) is integral to plate light guide 120. In particular, the integral tilted collimator 140 may not be substantially separable from the plate light guide 120, for example. For example, the tilted collimator 140 may be formed from a material of the plate light guide 120, e.g., as illustrated in FIG. 4A with the collimating reflector 140. Both of the integral collimating reflector 140 and the plate light guide 120 of FIG. 4A may be formed by injection molding a material that is continuous between the collimating reflector 140 and the plate light guide 120. The material of both of the collimating reflector 140 and the plate light guide 120 may be injection-molded acrylic, for example. In other examples, the tilted collimator 140 may be a substantially separate element that is aligned with and, in some instances, attached to the plate light guide 120 to facilitate coupling of light into the plate light guide 120.

According to some examples, the tilted collimator 140 when implemented as the collimating reflector 140 may further include a reflective coating on a curved surface (e.g., a parabolic shaped surface) of a material used to form the collimating reflector 140. A metallic coating (e.g., an aluminum film) or a similar 'mirroring' material may be applied to an outside surface of a curved portion of the material that forms the collimating reflector 140 to enhance a reflectivity of the surface, for example. In examples of the multibeam diffraction grating-based color backlight 100 that include the tilted collimator 140 integral to the plate light guide 120, the multibeam diffraction grating-based color backlight 100 may be referred to herein as being 'monolithic.'

In some examples, the collimating reflector 140 of the tilted collimator 140 includes a portion of a doubly curved paraboloid reflector. The doubly curved paraboloid reflector may have a first parabolic shape to collimate light in a first direction parallel to a surface of the plate light guide 120. In addition, the doubly curved paraboloid reflector may have a second parabolic shape to collimate light in a second direction substantially orthogonal to the first direction.

In some examples, the tilted collimator 140 includes a collimating reflector 140 that is a 'shaped' reflector. The shaped reflector in conjunction with the laterally displaced light sources 110 is configured to produce a first light beam 102 corresponding to a first color of the different colors of light and to produce a second light beam 102 corresponding to a second color of the different colors, as emitted from the multibeam diffraction grating 130. According to various examples, a principal angular direction of the first light beam 102 is about equal to a principal angular direction of the second light beam. In particular, to achieve an about equal principal angular direction for the first and second light beams 102, a method such as, but not limited to, ray-tracing optimization may be employed. Ray-tracing optimization may be used to adjust a shape of an initially parabolic reflector to yield the shaped reflector, for example. The ray-tracing optimization may provide a reflector shape adjustment that satisfies a constraint that both the first light beam 102 of a first color and a second light beam 102 of a second color have equal principal angular directions, for example, when the first and second light beams 102 exit the multibeam diffraction grating 130.

Figure 5:
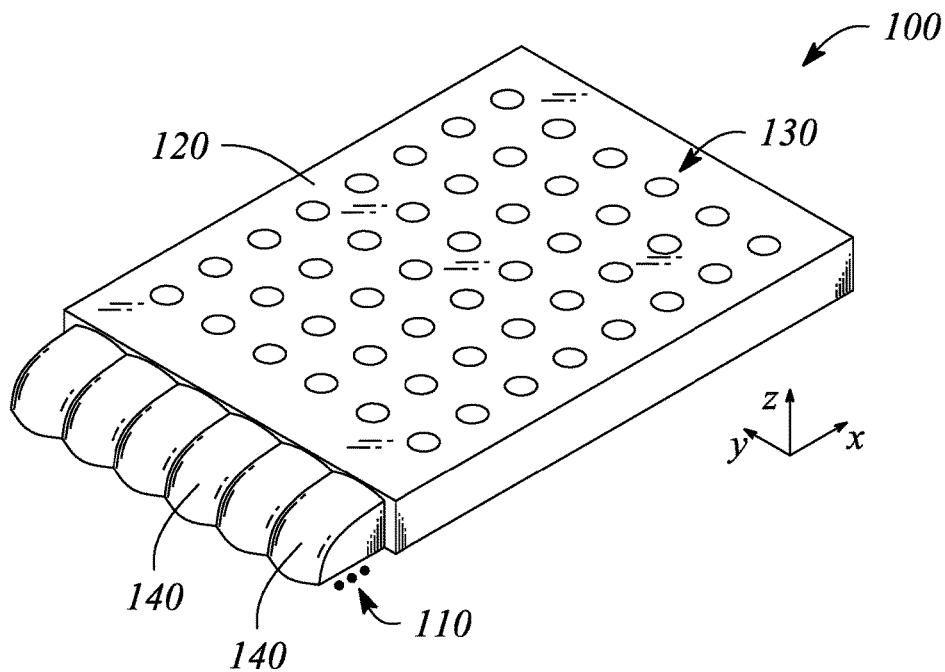
FIG. 5 illustrates a perspective view of the multibeam diffraction grating-based color backlight, according to an example consistent with the principles described herein.

FIG. 5 illustrates a perspective view of the multibeam diffraction grating-based color backlight 100, according to an example consistent with the principles described herein. In particular, as illustrated in FIG. 5, the multibeam diffraction grating-based color backlight 100 is monolithic having a plurality of integral collimating reflectors 140 at an edge of the plate light guide 120. Further, as illustrated, each of the collimating reflectors 140 has a doubly curved parabolic shape to collimate light in both a horizontal direction (i.e., a y-axis) and a vertical direction (i.e., a z-axis). Moreover, the multibeam diffraction gratings 130 are illustrated as circular features on the plate light guide surface in FIG. 5, by way of example. A plurality of laterally displaced light sources 110 of different colors are depicted below a first one of the collimating reflectors 140, as further illustrated in FIG. 5. Although not explicitly illustrated, a separated plurality of laterally displaced light sources of different colors are below each of the other collimating reflectors 140 so that each collimating reflector 140 has its own set of light sources 110, according to various examples.

In some examples, the multibeam diffraction grating-based color backlight 100 is substantially optically transparent. In particular, both of the plate light guide 120 and the multibeam diffraction grating 130 may be optically transparent in a direction orthogonal to a direction of guided light propagation in the plate light guide 120, according to some examples. Optical transparency may allow objects on one side of the multibeam diffraction grating-based color backlight 100 to be seen from an opposite side, for example (i.e., seen through a thickness of the plate light guide 120). In other examples, the multibeam diffraction grating-based color backlight 100 is substantially opaque when viewed from a viewing direction (e.g., above a top surface).

According to some examples of the principles described herein, a color electronic display is provided. The color electronic display is configured to emit modulated light beams of different colors as pixels of the electronic display. Further, in various examples, the modulated, different colored, light beams may be preferentially directed toward a viewing direction of the color electronic display as a plurality of differently directed, modulated light beams having different colors. In some examples, the color electronic display is a three-dimensional (3-D) color electronic display (e.g., a glasses-free, 3-D color electronic display). Different ones of the modulated, differently directed light beams may correspond to different 'views' associated with the 3-D color electronic display, according to various examples. The different 'views' may provide a 'glasses free' (e.g., autostereoscopic) representation of information being displayed by the 3-D color electronic display, for example.

Figure 6:
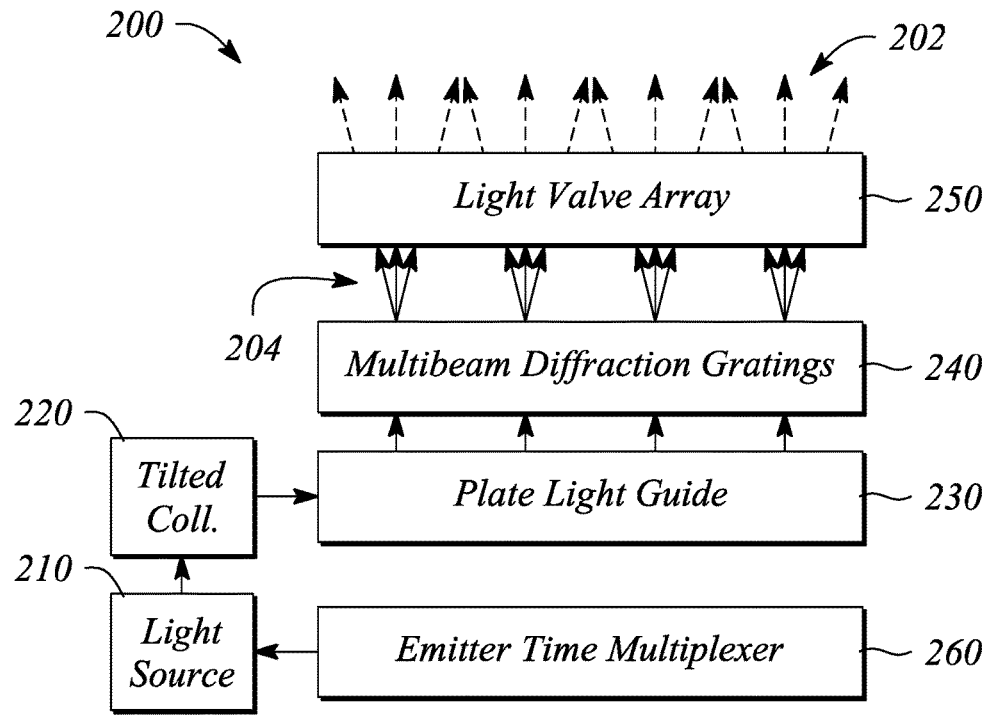
FIG. 6 illustrates a block diagram of an electronic display, according to an example consistent with the principles described herein.

FIG. 6 illustrates a block diagram of a color electronic display 200, according to an example consistent with the principles described herein. In particular, the electronic display 200 illustrated in FIG. 6 is a 3-D color electronic display 200 (e.g., a 'glasses free' 3-D color electronic display) configured to emit modulated light beams 202. According to various examples, the modulated light beams 202 include light beams 202 having a plurality of different colors.

As illustrated in FIG. 6, the 3-D color electronic display 200 includes a light source 210. The light source 210 includes a plurality of optical emitters of different colors laterally displaced from one another. In some examples, the light source 210 is substantially similar to the plurality of light sources 110 described above with respect to the multibeam diffraction grating-based color backlight 100. In particular, an optical emitter of the light source 210 is configured to emit or produce light having a color or equivalently a wavelength that differs from a color or wavelength of another optical emitter of the light source 210. Further, the optical emitter of the light source 210 is laterally displaced from the other optical emitters of the light source 210. For example, the light source 210 may include a first optical emitter to emit red light (i.e., a red optical emitter), a second optical emitter to emit green light (i.e., a green optical emitter), and a third optical emitter to emit blue light (i.e., a blue optical emitter). The first optical emitter may be laterally displaced from the second optical emitter and, in turn, the second optical emitter may be laterally displaced from the third optical emitter, for example.

The 3-D color electronic display 200 further includes a titled collimator 220. The tilted collimator 220 is configured to collimate light produced by the light source 210. The tilted collimator 220 is further configured to direct the collimated light into a plate light guide 230 at a non-zero tilt angle as guided light. In some examples, the tilted collimator 220 is substantially similar to the tilted collimator 140 of the multibeam diffraction grating-based color backlight 100, described above. In particular, in some examples, the tilted collimator 220 may include a collimating reflector that is substantially similar to the collimating reflector 140 of the multibeam diffraction grating-based color backlight 100. In some examples, the collimating reflector may have a shaped parabolic reflector surface (e.g., the collimating reflector may be a shaped reflector).

As illustrated in FIG. 6, the 3-D color electronic display 200 further includes the plate light guide 230 to guide the tilted collimated light produced at an output of the tilted collimator 220. The guided light in the plate light guide 230 is a source of the light that ultimately becomes the modulated light beams 202 emitted by the 3-D color electronic display 200. According to some examples, the plate light guide 230 may be substantially similar to the plate light guide 120 described above with respect to multibeam diffraction grating-based color backlight 100. For example, the plate light guide 230 may be a slab optical waveguide that is a planar sheet of dielectric material configured to guide light by total internal reflection. According to various examples, the optical emitters of the light source 210 are laterally displaced from one another in a direction corresponding to a propagation axis of the guided light within the plate light guide 230. For example, the optical emitters may be laterally displaced in the propagation axis (e.g., x-axis) direction in a vicinity of a focus or focal point of the collimating reflector.

The 3-D color electronic display 200 illustrated in FIG. 6 further includes an array of multibeam diffraction gratings 240 at a surface of the plate light guide. In some examples, the multibeam diffraction gratings 240 of the array may be substantially similar to the multibeam diffraction grating 130 of the multibeam diffraction grating-based color backlight 100, described above. In particular, the multibeam diffraction gratings 240 are configured to couple out a portion of the guided light from the plate light guide 230 as a plurality of light beams 204 representing different colors (e.g., different colors of a set of colors or color palette). Further, the multibeam diffraction grating 240 is configured to direct the light beams 204 of different colors in a plurality of different principal angular directions. In some examples, the plurality of light beams 204 of different colors having a plurality of different principal angular directions is a plurality of sets of light beams 204, wherein a set includes light beams of multiple colors that have the same principal angular direction. Further, the principal angular direction of light beams 204 in a set is different from the principal angular directions of light beams 204 in other sets in the plurality, according to some examples.

According to various examples, a principal angular direction of a modulated light beam 202 corresponding to light produced an optical emitter of the light source 210 may be substantially similar to a principal angular direction of another modulated light beam 202 corresponding to light produced by another optical emitter of the light source 210. For example, a principal angular direction of a red light beam 202 correspond to a first or red optical emitter may be substantially similar to a principal angular direction of one or both of a green light beam 202 and a blue light beam 202 of a second or green optical emitter and a third or blue optical emitter, respectively. The substantial similarity of the principal angular directions may be provided by the lateral displacements of the first (red) optical emitter, the second (green) optical emitter and the third (blue) optical emitter relative to one another in the light source 210, for example. Further, the substantial similarity may provide a pixel of the 3-D color electronic display 200 or equivalently a set of light beams 202 with a common principle angular direction having each of the light source colors, according to various examples.

In some examples, the multibeam diffraction grating 240 includes a chirped diffraction grating. In some examples, diffractive features (e.g., grooves, ridges, etc.) of the multibeam diffraction grating 240 are curved diffractive features. In yet other examples, the multibeam diffraction grating 240 includes a chirped diffraction grating having curved diffractive features. For example, the curved diffractive features may include a ridge or a groove that is curved (i.e., continuously curved or piece-wise curved) and a spacing between the curved diffractive features that may vary as a function of distance across the multibeam diffraction grating 240.

As illustrated in FIG. 6, the 3-D color electronic display 200 further includes a light valve array 250. The light valve array 250 includes a plurality of light valves configured to modulate the differently directed light beams 204 of the plurality, according to various examples. In particular, the light valves of the light valve array 250 are configured to modulate the differently directed light beams 204 to provide the modulated light beams 202 that are the pixels of the 3-D color electronic display 200. Moreover, different ones of the modulated, differently directed light beams 202 may correspond to different views of the 3-D electronic display. In various examples, different types of light valves in the light valve array 250 may be employed including, but not limited to, liquid crystal light valves or electrophoretic light valves. Dashed lines are used in FIG. 6 to emphasize modulation of the light beams 202. According to various examples, a color of a modulated light beam 202 is due in part or in whole to a color of the differently directed light beams 204 produced by the multibeam diffraction grating 240. For example, a light valve of the light valve array 250 may not include a color filter to produce modulated light beams 202 having different colors.

According to various examples, the light valve array 250 employed in the 3-D color electronic display 200 may be relatively thick or equivalently may be spaced apart from the multibeam diffraction grating 240 by a relatively large distance. A relatively thick light valve array 250 or a light valve array 250 that is spaced apart from the multibeam diffraction grating 240 may be employed since the multibeam diffraction grating 240 provides light beams 204 directed in a plurality of different principal angular directions, according to various examples of the principles described herein. In some examples, the light valve array 250 (e.g., using the liquid crystal light valves) may be spaced apart from the multibeam diffraction grating 240 or equivalently may have a thickness that is greater than about 50 micrometers. In some examples, the light valve array 250 may be spaced apart from the multibeam diffraction grating 240 or include a thickness that is greater than about 100 micrometers. In yet other examples, the thickness or spacing may be greater than about 200 micrometers. In some examples, the relatively thick light valve array 250 may be commercially available (e.g., a commercially available liquid crystal light valve array).

In some examples, the plurality of differently directed light beams 204 produced by the multibeam diffraction grating 240 is configured to converge or substantially converge (e.g., cross one another) at or in a vicinity of a point above the plate light guide 230. By 'substantially converge' it is meant that the differently directed light beams 204 are converging below or before reaching the 'point' or vicinity thereof and diverging above or beyond the point or point vicinity. Convergence of the differently directed light beams 204 may facilitate using the relatively thick light valve array 250, for example.

Figure 7:
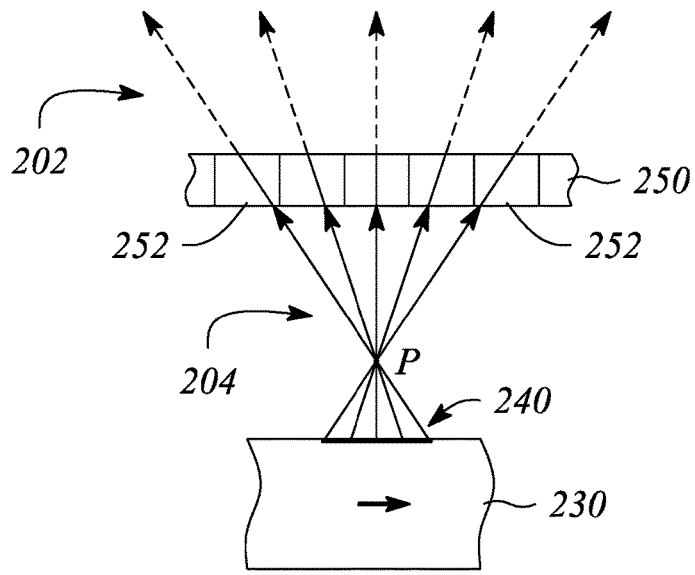
FIG. 7 illustrates a cross sectional view of a plurality of differently directed light beams that converge at a convergence point P, according to an example consistent with the principles described herein.

FIG. 7 illustrates a cross sectional view of a plurality of differently directed light beams 204 that converge at a convergence point P, according to an example consistent with the principles described herein. As illustrated in FIG. 7, the convergence point P is located between the multibeam diffraction grating 240 on the surface of the plate light guide 230 and the light valve array 250. In particular, the light valve array 250 is located at a distance from the plate light guide surface that is beyond the convergence point P of the differently directed light beams 204. Further, as illustrated, each of the differently directed light beams 204 passes through a different cell or light valve 252 of the light valve array 250. The differently directed light beams 204 may be modulated by the light valves 252 of the light valve array 250 to produce the modulated light beams 202, according to various examples. Dashed lines are used in FIG. 7 to emphasize that modulation of the modulated light beams 202. A horizontal heavy arrow in the plate light guide 230 in FIG. 7 represents guided light of different colors within the plate light guide 230 that is coupled out by the multibeam diffraction grating 240 as the differently directed light beams 204 having different colors corresponding to the guided light from the optical emitters of different colors in the light source 210.

Referring again to FIG. 6, the 3-D color electronic display 200 may further include an emitter time multiplexer 260 to time multiplex the optical emitters of the light source 210, according to some examples. In particular, the emitter time multiplexer 260 is configured to sequentially activate each of the optical emitters of the light source 210 during a time interval. Sequential activation of the optical emitters is to sequentially produce light of a color corresponding to a respective activated optical emitter during a corresponding time interval of a plurality of different time intervals. For example, the emitter time multiplexer 260 may be configured to activate a first optical emitter (e.g., a red emitter) to produce light from the first optical emitter (e.g., red light) during a first time interval. The emitter time multiplexer 260 may be configured to activate a second optical emitter (e.g., a green emitter) to produce light from the second optical emitter (e.g., green light) during a second time interval after the first time interval, and so on. Time multiplexing the optical emitters of different colors may allow a person that is viewing the 3-D color electronic display 200 to perceive a combination of the different colors, according to various examples. In particular, when time multiplexed by the emitter time multiplexer 260, the optical emitters may produce a combination of different colors of light that ultimately result in a light beam 202 having a principal angular direction and a color (e.g., a perceived color) that represents a combination of the time-multiplexed different colors, for example. The emitter time multiplexer 260 may be implemented as a state machine (e.g., using a computer program, stored in memory and executed by a computer), according to various examples.

Figure 8:
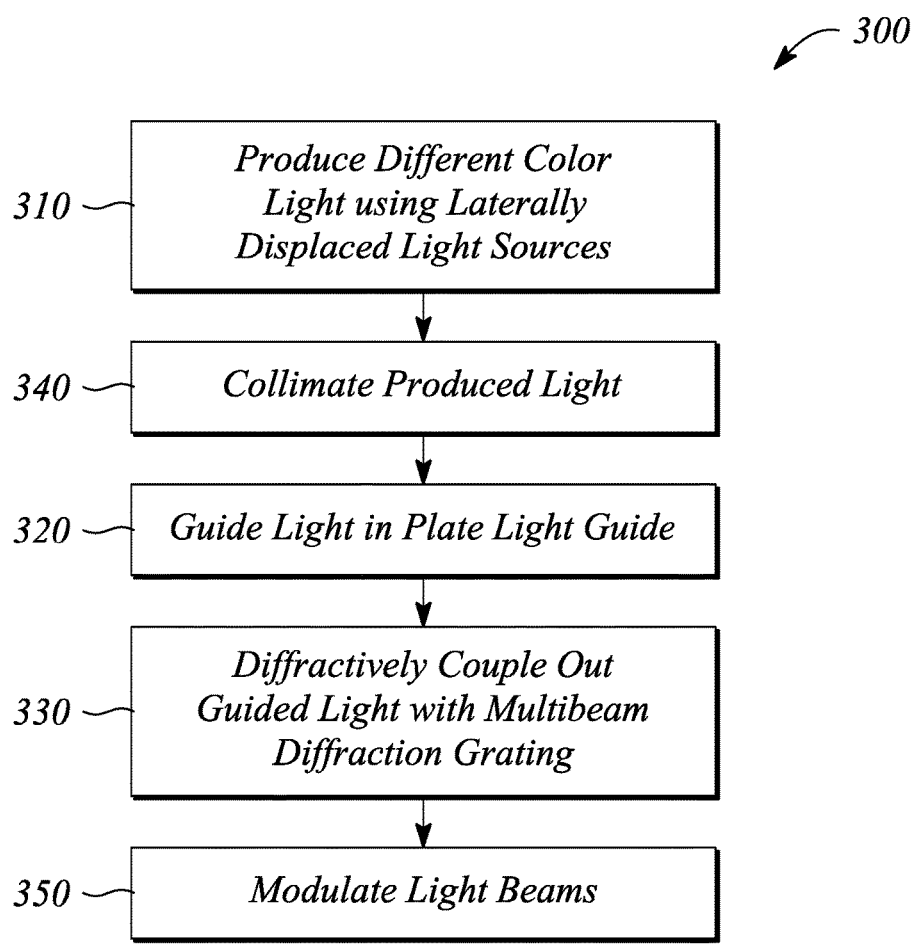
FIG. 8 illustrates a flow chart of a method of color electronic display operation, according to an example consistent with the principles described herein.

According to some examples of the principles described herein, a method of color electronic display operation is provided. FIG. 8 illustrates a flow chart of a method 300 of color electronic display operation, according to an example consistent with the principles described herein. As illustrated in FIG. 8, the method 300 of color electronic display operation includes producing 310 light using a plurality of light sources laterally displaced from one another. In some examples, the plurality of light sources used in producing 310 light is substantially similar to the plurality of light sources 110 described above with respect to the multibeam diffraction grating-based color backlight 100 that are laterally displaced. In particular, a light source of the light source plurality produces 310 light of a color different from colors produced by other light sources of the light source plurality.

The method 300 of color electronic display operation illustrated in FIG. 8 further includes guiding 320 light in a plate light guide. In some examples, the plate light guide and the guided light may be substantially similar to the plate light guide 120 and the guided light 104, described above with respect to the multibeam diffraction grating-based color backlight 100. In particular, in some examples, the plate light guide may guide 320 the guided light according to total internal reflection. Further, the plate light guide may be a substantially planar dielectric optical waveguide (e.g., a planar dielectric sheet), in some examples. Further, the lateral displacement of the light sources is in a direction corresponding to a propagation axis in the plate light guide (e.g., the x-axis as illustrated in FIGS. 2A and 2C).

As illustrated in FIG. 8, the method 300 of color electronic display operation further includes diffractively coupling out 330 a portion of the guided light using a multibeam diffraction grating. According to various examples, the multibeam diffraction grating is located at a surface of the plate light guide. For example, the multibeam diffraction grating may be formed in the surface of the plate light guide as grooves, ridges, etc. In other examples, the multibeam diffraction grating may include a film on the plate light guide surface. In some examples, the multibeam diffraction grating is substantially similar to the multibeam diffraction grating 130 described above with respect to the multibeam diffraction grating-based color backlight 100. In particular, the portion of guided light that is diffractively coupling out 330 of the plate light guide by the multibeam diffraction grating produces a plurality of light beams. The light beams of the plurality of light beams are redirected away from the plate light guide surface. In particular, a light beam of the light beam plurality that is redirected away from the surface has a different principal angular direction from other light beams of the plurality. In some examples, each redirected light beam of the plurality has a different principal angular direction relative to the other light beams of the plurality. Moreover, the plurality of light beams produced through diffractive coupling out 330 by the multibeam diffraction grating has light beams of different colors from one another, according to various examples.

According to some examples (e.g., as illustrated in FIG. 8), the method 300 of color electronic display operation further includes collimating 340 the produced 310 light from the plurality of light sources and directing the collimated light into the plate light guide using a tilted collimator. In some examples, the tilted collimator is substantially similar to the tilted collimator 140 described above with respect to the multibeam diffraction grating-based color backlight 100. In particular, in some examples, collimating 340 the produced light may include a collimating reflector to direct the collimated light at a tilt angle θ relative to the plate light guide surface as well as the propagation axis of the plate light guide. In some examples, the light from a respective light source of the light source plurality has a corresponding tilt angle θ determined by both a tilt of the collimating reflector and a lateral displacement of the respective light source relative to a focus or focal point of the collimating reflector.

According to some examples, the method 300 of color electronic display operation further includes modulating 350 the plurality of light beams using a corresponding plurality of light valves, as illustrated in FIG. 8. Light beams of the plurality of light beams may be modulated 350 by passing through or otherwise interacting with the corresponding plurality of light valves, for example. The modulated 350 light beams may form pixels of a three-dimensional (3-D) color electronic display. For example, the modulated 350 light beams may provide a plurality of views of the 3-D color electronic display (e.g., a glasses-free, 3-D color electronic display). In some examples, the 3-D color electronic display may be substantially similar to the 3-D color electronic display 200, described above.

According to various examples, the light valves employed in modulating 350 may be substantially similar to the light valves of the light valve array 250 of the 3-D color electronic display 200, described above. For example, the light valves may include liquid crystal light valves. In another example, the light valves may be another type of light valve including, but not limited to, an electrowetting light valve or an electrophoretic light valve.

According to some examples (not illustrated in FIG. 8), the method 300 of color electronic display operation further includes time multiplexing the light sources of the light source plurality. In particular, time multiplexing includes sequentially activating the light sources to produce light corresponding to the color of the respective activated light source during a corresponding time interval of a plurality of different time intervals. Time multiplexing may be provided by a light source time multiplexer substantially similar to the emitter time multiplexer 260 described above with respect to the 3-D color electronic display 200, for example.

Thus, there have been described examples of a multibeam diffraction grating-based color backlight, a 3-D color electronic display and a method of color electronic display operation that employ a multibeam diffraction grating and a plurality of laterally displaced light sources to provide a plurality of differently directed, different color light beams. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multibeam diffraction grating-based color backlight comprising:
    a plurality of light sources of different colors;
    a plate light guide to guide light of the different colors produced by the light sources, the light sources being laterally displaced from one another in a direction of a propagation axis of the guided light within the plate light guide; and
    a multibeam diffraction grating at a surface of the plate light guide to diffractively couple out a portion of the guided light from the plate light guide as a plurality of light beams having the different colors, a light beam of the light beam plurality having a principal angular direction different from principal angular directions of other light beams of the light beam plurality,
    wherein a principal angular direction of a light beam of a color corresponding to a respective light source is a function of the lateral displacement of the respective light source.

2. The multibeam diffraction grating-based color backlight of claim 1, wherein the multibeam diffraction grating comprises a chirped diffraction grating.

3. The multibeam diffraction grating-based color backlight of claim 1, wherein the multibeam diffraction grating comprises one of curved grooves and curved ridges that are spaced apart from one another.

4. The multibeam diffraction grating-based color backlight of claim 1, further comprising a tilted collimator between the plurality of light sources and the plate light guide, the tilted collimator to collimate and tilt light from the light sources and to direct the tilted and collimated light into the plate light guide as the guided light.

5. The multibeam diffraction grating-based color backlight of claim 4, wherein the tilted collimator comprises a collimating reflector to reflect the collimated light at a tilt angle relative to a top surface and a bottom surface of the plate light guide, the tilt angle being both greater than zero and less than a critical angle of total internal reflection within the plate light guide, and wherein light from a respective light source of the light source plurality has a corresponding tilt angle determined by both a tilt of the collimating reflector and a lateral displacement of the respective light source relative to a focus of the collimating reflector.

6. The multibeam diffraction grating-based color backlight of claim 5, wherein the collimating reflector is integral to and formed from a material of the plate light guide, the collimating reflector comprising a portion of a doubly curved paraboloid reflector having a first parabolic shape to collimate light in a first direction parallel to a surface of the plate light guide and a second parabolic shape to collimate light in a second direction orthogonal to the first direction.

7. The multibeam diffraction grating-based color backlight of claim 5, wherein the collimating reflector is a shaped reflector, the shaped reflector in conjunction with the laterally displaced light sources to produce a first light beam corresponding to a first color of the different colors of light and to produce a second light beam corresponding to a second color of the different colors, a principal angular direction of the first light beam being about equal to a principal angular direction of the second light beam.

8. A three-dimensional (3-D) color electronic display comprising the multibeam diffraction grating-based color backlight of claim 1, the 3-D color electronic display further comprising a light valve to modulate a light beam of the light beam plurality, the light valve being adjacent to the multibeam diffraction grating, wherein the light beam to be modulated by the light valve corresponds to a pixel of the 3-D color electronic display.

9. A three-dimensional (3-D) color electronic display comprising:
    a light source comprising a plurality of optical emitters of different colors;
    a plate light guide to guide light of the different colors produced by the light source at a non-zero tilt angle as guided light, the different color optical emitters being laterally displaced from one another in a direction of a propagation axis of the guided light within the plate light guide;
    an array of multibeam diffraction gratings at a surface of the plate light guide to couple out a portion of the guided light as a plurality of light beams representing the different colors and to direct the light beams in a plurality of different principal angular directions away from the plate light guide; and
    a light valve array to modulate the differently directed light beams, the modulated differently directed light beams representing pixels of the 3-D color electronic display,
    wherein the different principal angular directions of the plurality of light beams are a function of the lateral displacements of the different color optical emitters.

10. The 3-D color electronic display of claim 9, wherein the plurality of optical emitters comprises a first optical emitter to emit red light, a second optical emitter to emit green light, and a third optical emitter to emit blue light, and wherein a principal angular direction of a red light beam from the first optical emitter is substantially similar to a principal angular direction of one or both of a green light beam and a blue light beam respectively from the second and third optical emitters as determined by the lateral displacements of the first optical emitter, the second optical emitter and the third optical emitter relative to one another.

11. The 3-D color electronic display of claim 9, wherein the multibeam diffraction grating comprises a chirped diffraction grating having curved diffractive features.

12. The 3-D color electronic display of claim 9, wherein the plurality of light beams produced by the multibeam diffraction grating is to substantially converge at a point above the plate light guide surface, and wherein the light valve array is located at a distance from the plate light guide surface that is beyond the convergence point of the light beams.

13. The 3-D color electronic display of claim 9, wherein the light valve array comprises a plurality of liquid crystal light valves.

14. The 3-D color electronic display of claim 9, further comprising an emitter time multiplexer to time multiplex the optical emitters of the light source, wherein the time multiplexer is to sequentially activate each of the optical emitters of the light source to produce light of a different color corresponding to the respective activated optical emitter during a corresponding time interval of a plurality of different time intervals.

15. The 3-D color electronic display of claim 9, further comprising a tilted collimator to collimate light produced by the light source and to direct the collimated light into the plate light guide at the non-zero tilt angle as the guided light.

16. The 3-D color electronic display of claim 15, wherein the tilted collimator comprises a collimating reflector having a shaped parabolic reflector surface, the optical emitters being in a vicinity of a focus of the collimating reflector.

17. A method of color electronic display operation, the method comprising:
producing light using a plurality of light sources laterally displaced from one another, a light source of the light source plurality producing light of a color different from colors produced by other light sources of the light source plurality;
guiding the produced light in a plate light guide; and
diffractively coupling out a portion of the guided light using a multibeam diffraction grating at a surface of the plate light guide to produce a plurality of light beams having different colors directed away from the plate light guide in a plurality of different principal angular directions,
wherein the light sources are laterally displaced in a direction of a propagation axis of the guided light within the plate light guide.

18. The method of color electronic display operation of claim 17, further comprising collimating the produced light and directing the collimated light into the plate light guide using a tilted collimator, wherein the tilted collimator comprises a collimating reflector to reflect the collimated light at a tilt angle relative to the plate light guide surface, and wherein the light from a respective light source of the light source plurality has a corresponding tilt angle determined by both a tilt of the collimating reflector and a lateral displacement of the respective light source relative to a focus of the collimating reflector.

19. The method of color electronic display operation of claim 17, further comprising modulating the plurality of light beams using a corresponding plurality of light valves, the modulated light beams forming pixels of a three-dimensional (3-D) electronic display.

20. The method of color electronic display operation of claim 17, further comprising time multiplexing the light sources of the light source plurality, wherein time multiplexing comprises sequentially activating the light sources, an activated light source to produce light of a respective color during a time interval of a plurality of time intervals.

* * * * *